United States Patent [19]

Adcock

[11] 4,443,846
[45] Apr. 17, 1984

[54] DUAL PORT EXCHANGE MEMORY BETWEEN MULTIPLE MICROPROCESSORS

[75] Inventor: Ralph L. Adcock, Irvine, Calif.

[73] Assignee: Sperry Corporation, New York, N.Y.

[21] Appl. No.: 220,299

[22] Filed: Dec. 29, 1980

[51] Int. Cl.³ ............................................ G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,118,771 | 10/1978 | Pomella et al. | 364/101 |
| 4,130,865 | 12/1978 | Heart et al. | 364/200 |
| 4,153,934 | 5/1979 | Sato | 364/200 |
| 4,204,251 | 5/1980 | Brudevold | 364/200 |
| 4,214,305 | 7/1980 | Tokita et al. | 364/200 |
| 4,215,399 | 7/1980 | Pavicic et al. | 364/101 |

*Primary Examiner*—Mark E. Nusbaum
*Assistant Examiner*—Mark P. Watson
*Attorney, Agent, or Firm*—G. Donald Weber, Jr.; Eugene T. Battjer

[57] ABSTRACT

There is described a unique apparatus for exchanging commands and data via a dedicated memory which has ports connected to the data and address busses of two different microprocessors. The system operates even though the microprocessors have different word lengths, e.g. a sixteen bit processor and an eight bit processor. The system permits interfacing between the microprocessors with different bit size words and allows each of the microprocessors to treat the exchange memory as part of its own memory space without locking one microprocessor off of a shared bus.

3 Claims, 3 Drawing Figures

FIG. 2

DUAL PORT EXCHANGE MEMORY BETWEEN MULTIPLE MICROPROCESSORS

BACKGROUND

1. Field of the Invention

This invention is directed to computing systems, in general, and to systems using a common memory which can be accessed by a plurality of microprocessors and includes systems wherein the microprocessor have different size words.

2. Prior Art

In the rapid expansion of computer system technology, it has become commonplace for devices called microprocessors to be used as portions of the computing systems. In many cases, the microprocessors are used as supplemental units or circuits to perform specific tasks or functions either under the direct control of the central processing unit (CPU) or as an adjunct thereto. In most cases, the microprocessor is arranged to have separate memory capability which does not interface with or interact with the main memory of the computing system. However, there are times when it is highly desirable to permit or even require an exchange of information between the processor and the computer system.

With the introduction of multiple microprocessors into many computer systems, it is almost essential that the microprocessors be able to communicate with each other. This situation has created problems inasmuch as many of the microprocessors have different word lengths, e.g. 16-bit or 8-bit words, which complicates the exchange of information. Moreover, the use of multiple microprocessors typically requires the use of multiple peripheral equipment such as memories an the like. This, of course, becomes expensive in terms of programming, hardware, system geography and the like. Consequently, it is highly desirable to have the microprocessors share as much as the peripheral equipment as possible. To this end, communication between the processors is highly desirable.

However, it must be understood that this communication requires appropriate data and/or command busses and addresses in the microprocessors. In addition, unless totally separate communication busses are provided, elaborate control of the bus may be required or inefficient utilization of the microprocessors will frequently occur. Consequently, it is highly desirable to provide computing systems wherein the microprocessors can communicate with each other irrespective of word length. It is further desirable to permit the microprocessors to exchange data and/or commands with a common memory without effectively locking one or more of the microprocessors off of a shared bus.

SUMMARY OF THE INVENTION

There is shown and described a computer system using a plurality of microprocessors which have different bit word lengths. the microprocessors are connected to a common memory via a multiplexer. A control logic network is provided to control the operation of the multiplexer and to assure that the memory and the appropriate microprocessor are interconnected at the proper times. The logic circuits also control which byte of the larger word length is to be operated upon. An interlock arrangement is used to control the multiplexer operation as well.

DESCRIPTION OF A PREFERRED EMBODIMENT

Figure 1:
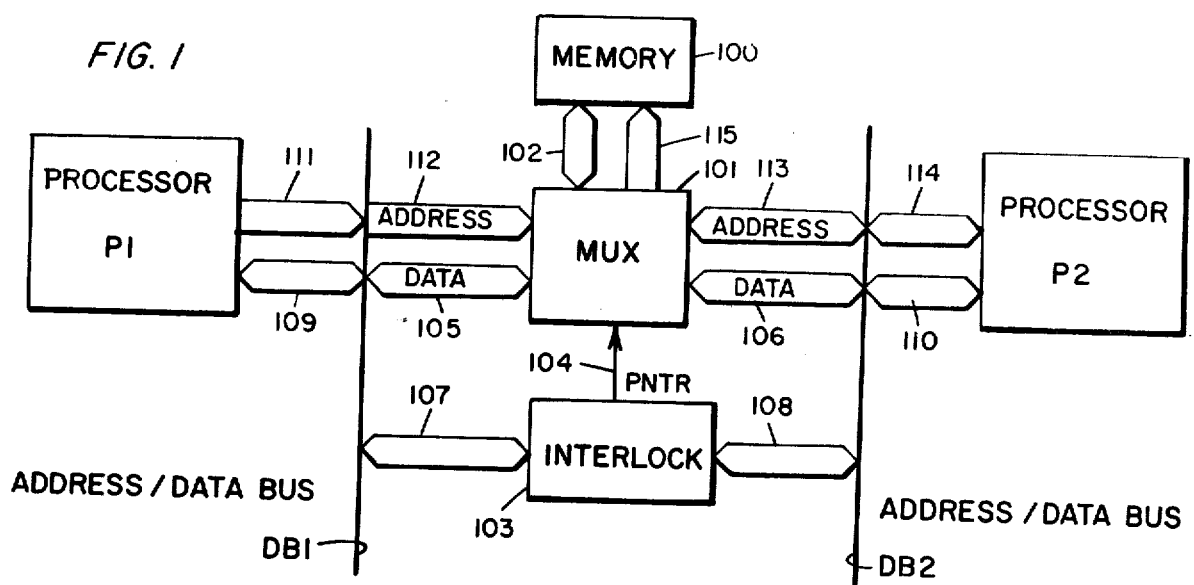
FIG. 1 is a block diagram of the computing system of the instant invention.

Referring now to FIG. 1, there is shown a block diagram of a preferred embodiment of the instant invention. In this embodiment, a memory 100 is depicted. This memory can be a scratch pad or exchange memory of any suitable configuration. Typically, memory 100 is a random access memory (RAM).

A multiplexer 101 (MUX) is connected to memory 100 via bidirectional memory bus 102 and unidirectional bus 115. Bidirectional bus 102 permits data to be exchanged between the memory 100 and MUX 101. Bus 115 is used to select the address of the memory location by MUX 101. MUX 101 is connected to interlock circuit 103 by means of the pointer bus 104. The interlock circuit 103 provides a pointer signal (PNTR) along bus 104 which signal selectively controls the operation of MUX 101.

MUX 101 is connected to address/data bus DB1 via address transfer bus 112 and data transfer bus 105, respectively. The bus 105 is a bidirectional bus wherein data can be transmitted either from bus DB1 to the MUX 101 or from the MUX to the data bus. Conversely, address bus 112 is unidirectional to transfer address information from the DB1 bus to MUX 101.

Similarly, MUX 101 is connected to address/data bus DB2 via address transfer bus 113 and data transfer bus 106. In this instance, bus 113 and bus 106 are both bidirectional busses.

In addition, the interlock circuit 103 is connected to the data busses DB1 and DB2 via the interlock busses 107 and 108. Busses 107 and 108 are also bidirectional busses which permit information to be transferred from the respective data busses to the interlock circuit and vice versa.

Processor P1 is connected to address data bus DB1 via processor address bus 111 and processor data bus 109 while processor P2 is connected to data bus DB2 by address bus 114 and processor data bus 110. Processor busses 109, 110 and 114 are each bidirectional wherein data can be transferred from the respective data bus to the respective processor or vice versa. Conversely, bus 111 is unidirectional for supplying address information to the address/data bus DB2.

In operation, one of the processors is identified and assigned priority. In this instance, the priority is assigned to processor P2. Thus, if interlock 103 is not overtly locked to processor P1, as described hereinafter, processor P2 is connected to memory 100 via MUX 101 and the respective data transfer busses 102, 106 and 110 as well as data bus DB2 and the respective address buses 113, 114 and 115. In order for processor P1 to gain access to memory 100, processor P1 has to obtain control over the interlock 103 by writing a bit (typically a binary "1") into the interlock via bus 107. Processor P1 then "reads" the interlock circuit 103 to determine if the binary 1 was actually written therein. In the event that the binary 1 was not written into the interlock circuit 103 by processor P1 because processor P2 is already in control of interlock 103, processor P1 proceeds with other activity which does not require access to memory 100. Processor P1 will then return at a later time to repeat this process until a binary 1 is actually written into interlock 103 by processor P1. Meanwhile, processor P2 is connected to memory 100 and is able to function in any desired fashion with regard thereto.

When processor P2 has completed its operation relative to memory 100, processor P2 resets the interlock circuit which provides processor P1 the opportunity to write (and also read) the binary 1 into the interlock 103. When this occurs, the pointer 104 directs the MUX 101 to connect the memory and processor P1 via the appropriate data buses 102, 105, 109 and data bus DB1 as well as the address buses 111, 112 and 115. At the same time, processor P2 is now locked out of contact with memory 100 via MUX 101. At this time, processor P1 is now in contact with memory 100 and can access this memory to perform whatever functions are appropriate. When processor P1 has performed the appropriate function, the interlock circuit is switched wherein processor P2 can now access memory 100, to the exclusion of processor P1, if processor P2 is so inclined. Conversely, if processor P2 does not take control of the interlock circuit 103, processor P1 can return and take control of the interlock circuit and, therefore, access memory 100 to the exclusion of processor P2.

Thus, either of the processors can access exchange memory 100. However, the processors cannot concurrently interact with memory 100. Therefore, inappropriate action or operation of the respective processors is prevented. However, processor P2 effectively has control (or priority of control) over memory 100 as a function of the operation of interlock circuit 103. On the other hand, with the appropriate signal conditions, including surrendering of the pointer by processor P2, processor P1 can take control of the circuit and perform its desired functions.

Figure 2:
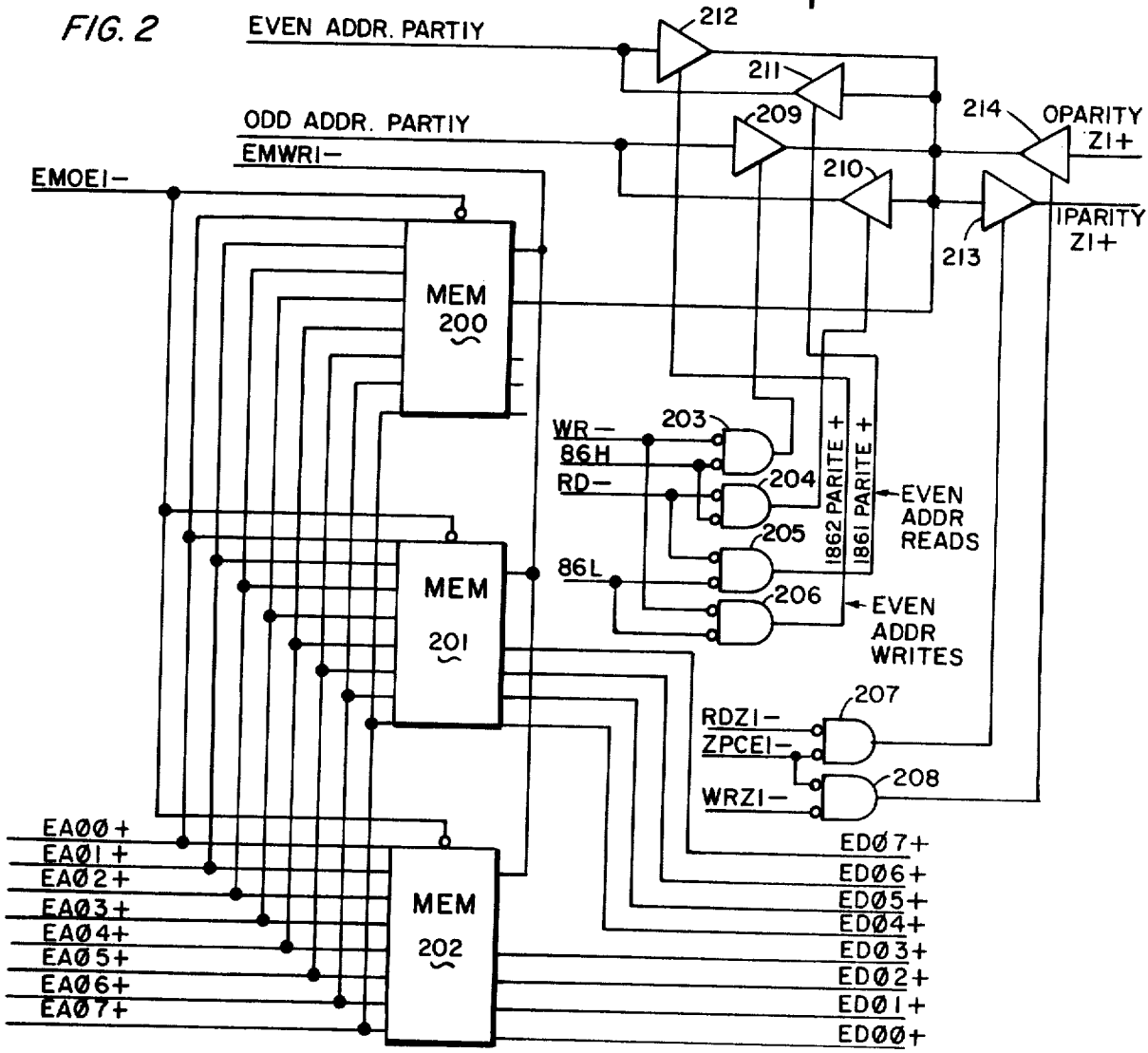
FIG. 2 is a logic diagram of the memory portion of the instant invention.

Referring now to FIG. 2, there is shown a schematic diagram of the memory and memory bus portion of the instant invention. In this embodiment, the memory is referred to as an exchange memory inasmuch as it exchanges information with and/or between the processors. The exchange memory is comprised of three memory units 200, 201 and 202. Each of these memory units is substantially identical in configuration and can be in the form of integrated circuit chips. In point of fact, the three memoby units shown can be combined in a single memory unit if the appropriate memory capacity and operation is available.

The input terminals of the memory units are connected to input lines EA00 through EA07 to receive signals of like designation. These lines and signals represent the exchange memory address signals on the exchange memory address bus. Similarly, the output terminals of memory units 201 and 202 are connected to the lines ED00 through ED07 which comprise the exchange memory data bus 112 and which carry signals of like designation. The exchange memory data bus and the exchange memory address bus are connected to the multiplexer and logic circuitry as shown in FIG. 3.

In operation, when the signal EMOE1— is supplied to memory units 200 through 202, the information at the address bus is entered or applied to the memory units. Conversely, when the "true" signal EMWR1— is applied to the memory circuits, the output signals, for example at the exchange memory data bus, are produced. (In this embodiment, EMWR1— is true when the signal is a low-level signal.)

The control apparatus related to the memory and, in particular, the parity of the signals is controlled by NOR gates 203 through 208. In particular, the write signal WR is supplied to one input terminal of each of gates 203 and 206. The read signal RD is supplied to one input terminal of each of gates 204 and 205. The input signal 86H is applied to one input terminal of each of gates 203 and 204. Likewise, the input signal 86L is applied to an input terminal of each of gates 205 and 206. The other read signal RDZ1 is supplied to one input terminal of gate 207. The other write signal WRZ1 is supplied to an input terminal of gate 208. The input signal ZPCE1 is supplied to one input terminal of each of gates 207 and 208. The output signals from gates 203 through 208 are applied to the enable terminals of the tristable gates 209 through 214, respectively. These signals and gates are directed to the parity checking of the circuit but form no portion of the invention, per se.

Figure 3:
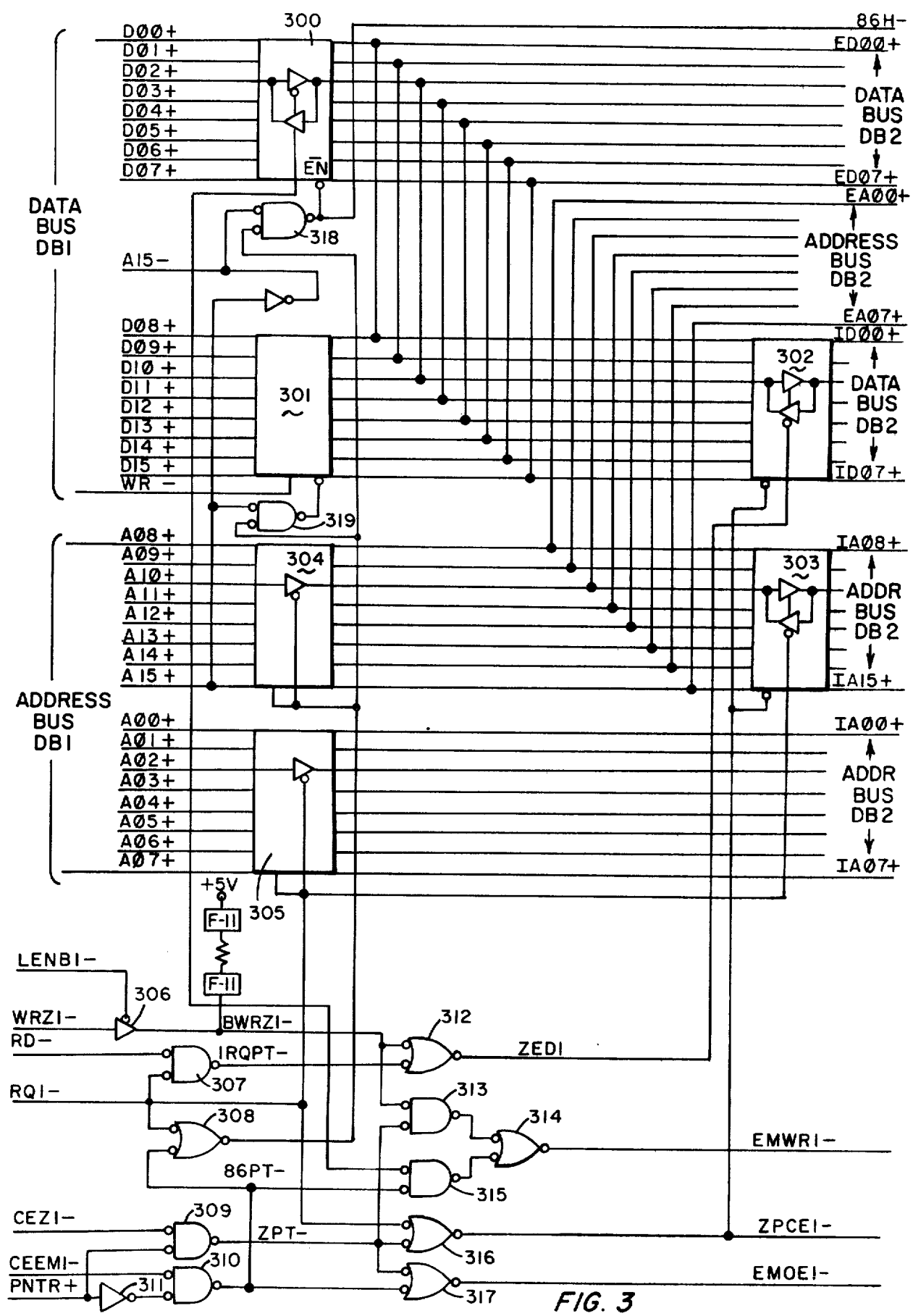
FIG. 3 is a logic diagram of the multiplexer, bus and logic portions of the instant invention.

Referring now to FIG. 3, there is shown a multiplexer circuit which includes transceiver circuits 300 through 303 and driver/receiver circuits 304 and 305. The transceiver circuits can transfer information therethrough in either direction while the driver/receiver circuits transfer information in only one direction. The input bits provided by data bus DB1 from processor P1 and represented by 16-bit words are applied to the multiplexer circuit as shown. In particular, the data bits D00 through D07 are applied to circuit 300 while the data bits D08 through D15 are applied to circuit 301. The address bits A00 through A07 are applied to circuit 305 while the address bits A08 through A15 are applied to circuit 304. Conversely, the data bus DB2 input signals are supplied to the input terminals of transceiver circuits 302 and 303. In particular, the data bits ID00 through ID07 are applied to circuit 302 while the address bits IA08 through IA15 are applied to circuit 303. The output terminals of circuits 303 and 304 are connected together to form exchange memory address bus 115 and to provide address signals EA00 through EA07 to memory 100. Similarly, the output terminals of circuits 301 and 302 are connected together and to the output terminals of circuit 300 to form the exchange memory data bus 102 and to provide data signals ED00 through ED07 to or from memory 100. These signal lines are connected to the memory as shown in FIG. 2.

The output terminals of circuit 305 are arranged to provide the output signals IA00 through IA07 which are combined with the other signals as described.

In the operation of the circuit, the signals A15+ and A15— are used to select the upper or lower byte of the data word which is to be produced or supplied by processor P1. That is, in this embodiment, processor P1 is a 16-bit device while processor P2 is an 8-bit device. It will be noted that in this embodiment, the A15 signal is the least significant bit (LSB) and conversely A00 is the most significant bit (MSB), contrary to all other known arrangements. By selecting the upper or lower 8-bit byte, by means of signals A15+ and A15—, word length compatibility is achieved between the processors.

Perhaps the two signals which are key to the circuit operation are the pointer signal PNTR and request (or select) signal RQ—. The RQ— signal is supplied to an input of each of gates 307, 308 and 316 as well as to transceiver 305 and to processor P2 (not shown). In this case, when RQ— is a low-level signal, data can be transferred from P1 to P2, in particular, via MUX's 300 and 301 to MUX 302. In other words, processor P1 is in control of the P2 bus. Also, address information is transferred via MUX's 304 and 305 to MUX 303. The low-level signal RQ— selects the processor P2 bus (i.e. DB2) as the source or destination of the information and, in effect, keeps processor P2 off of the input bus. Conversely, if RQ— is a high-level signal (the normal situation) there is no communication between processors P1 and P2 via the exchange circuitry.

In addition, the pointer signal PNTR, which indicates whether processor P1 or processor P2 is selected, is applied to the input of gate 310 via inverter 311 and to an input of OR gate 309. Reference is made to the copending application entitled "DUAL PORT MEMORY INTERLOCK", by Ralph L. Adcock bearing Ser. No. 06/220,300, filed on Dec. 29, 1980, and assigned to the common assignee for a discussion of the PNTR signal generator. The other input of gate 309 is connected to receive the input signal CEZ1 while the other input of gate 310 is connected to receive the input signal CEEM1. The signal CEZ1 is the address decode signal produced by processor P2 while the signal CEEM1 is the address decode signal produced by processor P1.

The pointer signal signal PNTR is normally at the low level and this condition connects processor P2 to the exchange memory 100. In particular, gate 309 is enabled by a low level pointer signal. When a low level input signal CEZ1 is also present, gate 309 produces a low level signal signal wherein gates 316 and 317 are enabled to produce low level output signals. A high level signal at CEZ1 will prevent selection of the momory. In this condition, gate 313 selects the read (RD) or write (WR) as a function of the WR operation signal from tristate gate 306. That is, when signal WRZ1— from gate 306 is a low level signal, gate 313 supplies a low level signal to gate 314 which produces the low level signal EMWR1— which controls the read/write operation of memorys 200, 201 and 202 (i.e., 0=WR; 1=RD). In other words, when WRZ1— is a low level signal, processor P2 is connected to write into the exchange memory 100. Conversely, when WRZ1— is a high level signal, processor P2 reads from the exchange memory 100. These operations, of course, presuppose that both the pointer (PNTR) and P2 address signal (CEZ1) are also low level signals to select processor P2. Also, gate 316 produces the ZPEC1 signal which selects and enables the processor P2 side of the MUX (i.e. MUX circuits 302 and 303). Likewise, gate 317 produces the low level EMOE signal which selects and enables the memory chips 200 through 202 (FIG. 2). Thus, processor P2 is effectively connected to the exchange memory through MUX's 302 and 303. Conversely, processor P1 is, effectively, locked out of the exchange memory because MUX's 300, 301 and 304 are not enabled.

On the other hand, when the pointer signal PNTR is a high level signal, processor P1 is selected. In this case, the PNTR signal is provided via inverter 311 and enables OR gate 310 (but gate 309 produces a high level output signal). With gate 310 enabled, and low level CEEM1 signal provided, gates 308, 315 and 317 are enabled. Again, gate 317 produces the chip enable signal EMOE1— for activating the exchange memory. Also, gate 308 supplies a low level signal which activates and enables the processor P1 side of the MUX 304. The low level signal is also applied to gates 318 and 319 which receive the A15 signal so that MUX's 300 and 301 are controlled thereby. Also, gate 315 selectively enables gate 314 in the presence of a low level write signal WR—. That is, with a low level WR— signal, (and gate 310 activated), gate 315 produces a low level signal which causes gate 314 to produce a low level signal EMWR1 which permits writing into the exchange memory 100 from whichever processor (P1 or P2) currently has control. Conversely, a high level WR— signal forces gate 351 to produce a high level output signal. Likewise, gate 313 produces a high level output as a result of the high level signal from gate 309. Consequently, gate 314 produces a high level signal in response to the pair of high level input signals. As a result the EMWR1— signal is a high level input signal which permits the exchange memory 100 to be read by whichever processor (P1 or P2) has control. (The WR— signal is produced by external control circuitry not shown in the Figures.)

It should be noted that the signal EMOE1— is enabled (i.e. low level) unless both processors P1 and 02 and the respective address decode signals CEZ1— and CEEM1— are not selected or activated to the low level. When signal EMOE1— is a high level signal, the memory is placed in the tristate condition and the bus connection and contents are controlling.

The RD— signal is also connected to an input of gate 307 along with the RQ— signal noted above. The RD— signal is a low level when processor P1 is to read information from processor P2. This occurs only when processor P2 has taken control of the P2 bus. Conversely, when RD— is a high level signal, the WR— signal is, effectively, in control of the read/write operation of the circuit. In particular, when the RD— signal is a high level signal, gate 307 produces a high level signal which is supplied to gate 312. When signal WRZ1— is low (WRZ1 is high) gate 312 produces a high output signal ZED1. This signal controls the operative direction of MUX 302. A high level signal permits information to pass from the exhange memory 100 to processor P2 via MUX 302. Conversely, a low level ZED1 signal permits information to pass from processor P2 to exchange memory 100 via MUX 302. However, the WRZ1— signal is only selectively passed through device 306 when control signal LENB1— is a low level signal. The control signal LENB1— is derived from the RQ— signal noted supra.

Thus, the pointer signal PNTR determines which chips of the memory are to be enabled. Also, the pointer signal is used to determine which multiplexers are enabled and thus, which processor is to be operated upon or with (relative to the exchange memory). The decode address signals CEEM1 and CEZ1 selectively control the address of the processor which is to be connected to the exchange memory, if selected by the pointer signal.

The RQ signal selectively enables communication between processors P1 and P2, in particular a transfer of information from P1 to P2. The WRZ1 signal selectively controls a write or a read operation between the exchange memory and processor P2 (when P2 is selected by PNTR and CEZ1). More particularly, processor P2 may, selectively, write into or read from the exchange memory.

Thus, there is shown and described a system wherein a single exchange memory with dual ports can be connected to operate between multiple microprocessors. Moreover, the microprocessors can have different bit lengths formats. In this system, the processors can communicate with each other, or, selectively, with the exchange memory without interference. The exchange circuitry is controlled by an interlock device and control logic circuits. The control circuitry is relatively simple and inexpensive. Specific circuits have been shown and suggested. However, these circuits are not intended to be limitative but are illustrative only. Any systems which fall within the purview of this description are intended to be included therein. The scope of the invention is limited only by the claims appended hereto.

Having thus described a preferred embodiment, what is claimed is:

1. A computing system comprising,
   first (P1) processor means,
   second (P2) processor means,
   one of said first and second processor means, operates upon words which are twice as long as the words operated upon by the other processor means,
   multiplexer means (101),
   first bus means (DB1) connected between said first processor means and said multiplexer means,
   second bus means (DB2) connected between said second processor means and said multiplexer means,
   said first and second bus means carry information in the form of data signals and address signals,
   the address signal carrying portion of one of said first and second bus means comprises bidirectional signal transmission means and the other of said first and second bus means comprises unidirectional signal transmission means,
   the data signal carrying portion of each of said first and second bus means comprises bidirectional signal transmission means,
   dedicated memory means (100) connected to said multiplexer means, and
   control means (103) connected to selectively supply a pointer signal (PNTR) to said multiplexer means to determine which of said first and second processor means is actively connected to said memory means via said multiplexer means,
   said control means supplies a read/write signal which determines that the read or the write operation is to be performed when a processor means is connected to said memory means via said multiplexer means in response to said pointer signal,
   said control means further connected to selectively supply a select signal to said multiplexer such that one of said processor means is actively connected directly to the other processor means via said multiplexer means.

2. The computing system recited in claim 1 wherein, said control means receives a signal from the processor means which operates on the longer word length which signal specifies which byte of said longer word is to operate upon.

3. The computing system recited in claim 1 wherein, said control means produces a control signal which selectively indicates that one of said processor means is connected to write into said memory means or, alternatively, to read from said memory means, as a function of the control signal status.

* * * * *